United States Patent [19]
Hori et al.

[11] Patent Number: 5,517,968
[45] Date of Patent: May 21, 1996

[54] AUTOMOBILE ENGINE CONTROL SYSTEM

[75] Inventors: Yasuyoshi Hori, Hiroshima; Kunitomo Minamitani, Kure; Futoshi Nishioka, Hiroshima, all of Japan

[73] Assignee: Mazda Motor Corporation, Hiroshima, Japan

[21] Appl. No.: 213,794

[22] Filed: Mar. 16, 1994

[30] Foreign Application Priority Data

Mar. 16, 1993 [JP] Japan ................................. 5-055597

[51] Int. Cl.⁶ .............................. F02D 41/18; F02P 5/15
[52] U.S. Cl. .................................... 123/417; 123/480
[58] Field of Search ............................. 123/416, 417, 123/478, 480, 486

[56] References Cited

U.S. PATENT DOCUMENTS

| | | | |
|---|---|---|---|
| 4,827,937 | 5/1989 | Kohler et al. | 123/417 |
| 4,886,030 | 12/1989 | Oba et al. | 123/417 |
| 4,986,245 | 1/1991 | Nakaniwa et al. | 123/417 |
| 5,003,950 | 4/1991 | Kato et al. | 123/417 |
| 5,190,008 | 3/1993 | Yamasaki et al. | 123/417 |
| 5,367,462 | 11/1994 | Klenk et al. | 123/480 |

FOREIGN PATENT DOCUMENTS 63-8296  2/1988  Japan .

*Primary Examiner*—Willis R. Wolfe
*Attorney, Agent, or Firm*—Keck, Mahin & Cate

[57] ABSTRACT

An engine control system establishes the injection amount of fuel based on a predicted amount of intake air at the end of an intake stroke based on a rate of change in the amounts of intake air between previous and current periods. An ignition time is based on an actual amount of intake air detected after the end of the intake stroke.

15 Claims, 5 Drawing Sheets

AUTOMOBILE ENGINE CONTROL SYSTEM

BACKGROUND OF THE INVENTION

1. Field of the Invention

The present invention relates to an automobile engine control system which establishes the amount of fuel injection based on a predicted amount of intake air and sets the timing of ignition based on the actual amount of intake air.

2. Description of Related Art

In recent years, electronically controlled engines have been widely used, which control the air-fuel ratio of a fuel mixture and the timing of ignition in accordance with driving conditions so as to improve its emission control characteristics or fuel consumption efficiency. With such an electronically controlled engine, a fuel injection valve, which injects a fuel into an air intake line, is controlled by a control unit comprising a microcomputer to set the amount of fuel injection so that the air-fuel ratio of the vaporized fuel mixture in the combustion chamber matches a specific target ratio for each combustion cycle. In other words, the control unit computes the ratio of intake air charged into the combustion chamber (air charging efficiency) for each combustion cycle so as to cause the fuel injector to inject fuel with a specific ratio relative to the air charging efficiency. The amount of air charged into the combustion chamber for each combustion cycle is basically computed by the control unit based on the amount of intake air detected by an air flow sensor and the rotational speed of engine detected by a speed sensor. Also, the timing of ignition is appropriately established by the control unit according to the amount of charged air.

In the ordinary fuel injection type of engines, in order to promote the mixing of fuel and intake air through contact between the two for a period of time as long as possible, the injection of fuel from the fuel injection valve is accomplished during the first half of an air intake stroke. Accordingly, it is essentially required to determine the amount of air to be charged into the combustion chamber prior to the commencement of fuel injection, i.e. at the beginning of the air intake stroke, for each combustion cycle. For this requirement, conventional electronically controlled engines typically compute the amount of intake air to be charged into the combustion chamber for each combustion cycle based on the amount of intake air detected at the beginning of an air intake stroke. However, when the charging amount of intake air for each combustion cycle is computed based on the amount of intake air at the beginning of the air intake stroke, the charging amount of air for each combustion cycle is not correctly detected during non-steady driving, such as during acceleration or deceleration. This is because there occurs changes in the amount of air introduced into the intake line with time during acceleration or deceleration and, consequently, it is difficult to detect the accurate amount of intake air. This leads to a deviation of the air-fuel ratio of a fuel mixture from the target ratio, resulting in deterioration in fuel consumption efficiency or in emission control characteristics.

In improved electronically controlled engines, the amount of intake air at the end of an air intake stroke is predicted or estimated based on the amount of intake air at the beginning of the air intake stroke and the rate of change in the amount of intake air at the same time. Then, on the basis of the predicted amount of intake air, the charging amount of intake air is computed for each combustion cycle, upon the basis of which the amount of fuel injection and the timing of ignition are determined. Such an electronically controlled engine is known from, for instance, Japanese Unexamined Patent Publication No. 63-8296.

However, in the electronically controlled engine described in the above publication, in which the amount of intake air is predicted or estimated at the end of an air intake stroke and the charging amount of air charged into the combustion chamber for each combustion cycle is computed based on this predicted amount of intake air, even though the predicted charging amount of intake air is ideal or optimum as a parameter for setting of the amount of fuel injection, it is not necessarily appropriate or optimum as a parameter for setting of the timing of ignition. As a result, with the electronically controlled engine, the timing of ignition, or the angle of advancement, deviates from the optimal timing, creating the problem that fuel consumption efficiency or emissions control characteristics can not be sufficiently enhanced.

SUMMARY OF THE INVENTION

It is an object of the present invention to provide an engine control system for an internal combustion engine that can establish a charging efficiency of intake air appropriate for both fuel injection control and ignition timing control, thereby enhancing fuel consumption efficiency and emission control, simultaneously.

The above object of the present invention is accomplished by providing an engine control system for an internal combustion engine which detects periodically the amount of intake air by an air flow sensor and finds the changing characteristic, or a rate of change, of actual amounts of intake air between previous and current periods, based on which it predicts the amount of intake air at the end of an intake stroke. The engine control system establishes the amount of fuel to be injected by a fuel injection valve based on the predicted amount of intake air at the end of the intake stroke and establishes the timing of ignition when the sparkplug ignites a fuel in the combustion chamber based on the actual amount of intake air detected after the end of the intake stroke by the air intake detection means.

BRIEF DESCRIPTION OF THE DRAWINGS

The above and other objects of the present invention will be clearly understood from the following description with respect to a preferred embodiment thereof when considered in conjunction with the accompanying drawings, in which.

DETAILED DESCRIPTION OF THE PREFERRED EMBODIMENT

Figure 1:
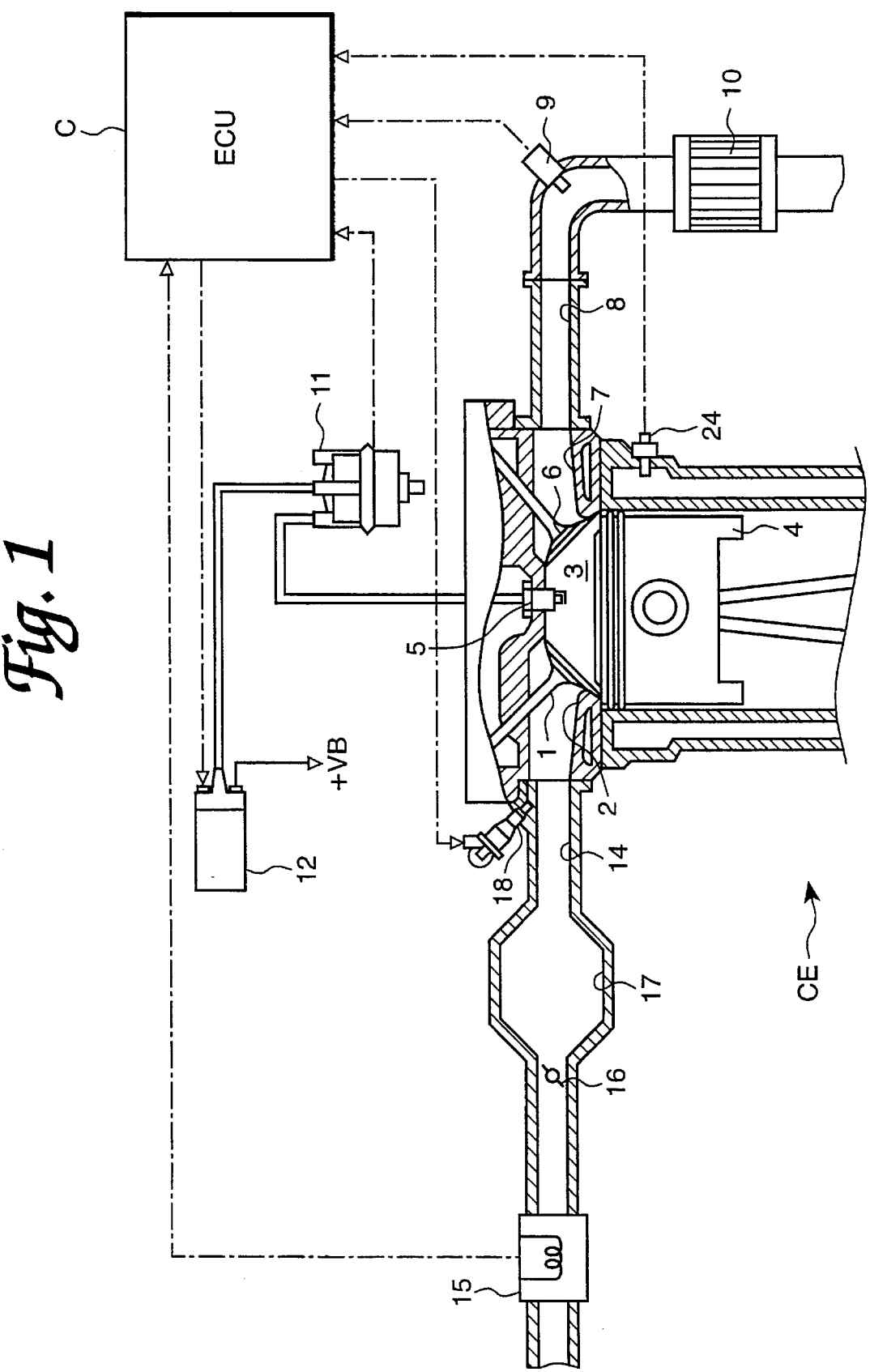
FIG. 1 is a schematic illustration of an internal combustion engine equipped with a control system in accordance with a preferred embodiment of the present invention.

Referring to the drawings in detail, and, in particular, to FIG. 1 showing a fuel injection type of electronically controlled engine, such as an internal combustion, gasoline engine CE, equipped with an engine control system in accordance with a preferred embodiment of the present invention, the engine CE is constructed such that it introduces a fuel mixture into a combustion chamber 3 through an intake port 2 when an intake valve 1 is open, ignites and burns the fuel mixture by a sparkplug 5 after having compressed it by a piston 4, and expels burned gases or exhaust gas into an exhaust line 8 through an exhaust port 7 when an exhaust valve 6 is opened. The exhaust line 8 is provided with an oxygen ($O_2$) sensor 9 that monitors or detects the concentration of oxygen in the exhaust gas, which is representative of an air-fuel ratio, and a catalytic converter 10 that purifies and cleans the exhaust gas. The engine CE is provided with a sparkplug 5 to which a high electric voltage is supplied by a distributor 11 and an ignition control device 12 at a specific timing determined by an electronic control unit (ECU) C comprising a microcomputer. The distributor 11 is capable of detecting the angle of crank as the speed of engine.

In order to supply air into an combustion chamber 3 of the engine CE, an intake line 14 is provided with its leading end open to the atmosphere and its terminal end through which it communicates into the intake port 2. This intake line 14 is provided, in order from the leading end, an air cleaner (not shown) for removing dust from air introduced into the intake line 14, a hot wire type of air flow sensor 15 for monitoring the amount of intake air, a throttle valve 16 which is opened and closed in cooperation with an accelerator pedal (not shown), and a surge tank 17 for stabilizing the flow of air into the engine CE. In close proximity to the intake port 2 the intake line 14 is provided with a fuel injection valve 18 for injecting fuel into the intake port 2 such that the fuel injection valve 18 directs fuel toward the intake port 2. The fuel injection valve 18 is pulsed by the control unit (ECU) C so as to be open and kept open according to the pulse width upon which the amount of fuel delivered by the fuel injection valve 18 depends. Similarly, the timing of fuel injection by the fuel injector valve 18 is controlled by the control unit (ECU) C in the manner described hereafter.

The control unit (ECU) C serves as a comprehensive integrated engine control system for various functions, including the prediction of the amount of intake air, the determination of the pulse width and the timing of fuel injection for the fuel injector valve 18 with the use of control parameters, such as the concentration of oxygen in exhaust gas, which is representative an air-fuel ratio, detected by the oxygen (02) sensor 9, the crank angle, which representative of the rotational speed of engine detected by the distributor 11, the amount of intake air detected by the air flow sensor 15, the temperature of coolant water, which is representative of the temperature of engine, detected by the temperature sensor 24, the temperature of intake air detected by an air temperature sensor (not shown), the opening of the throttle valve 16 detected by the throttle opening sensor (not shown), etc.

Figure 2:
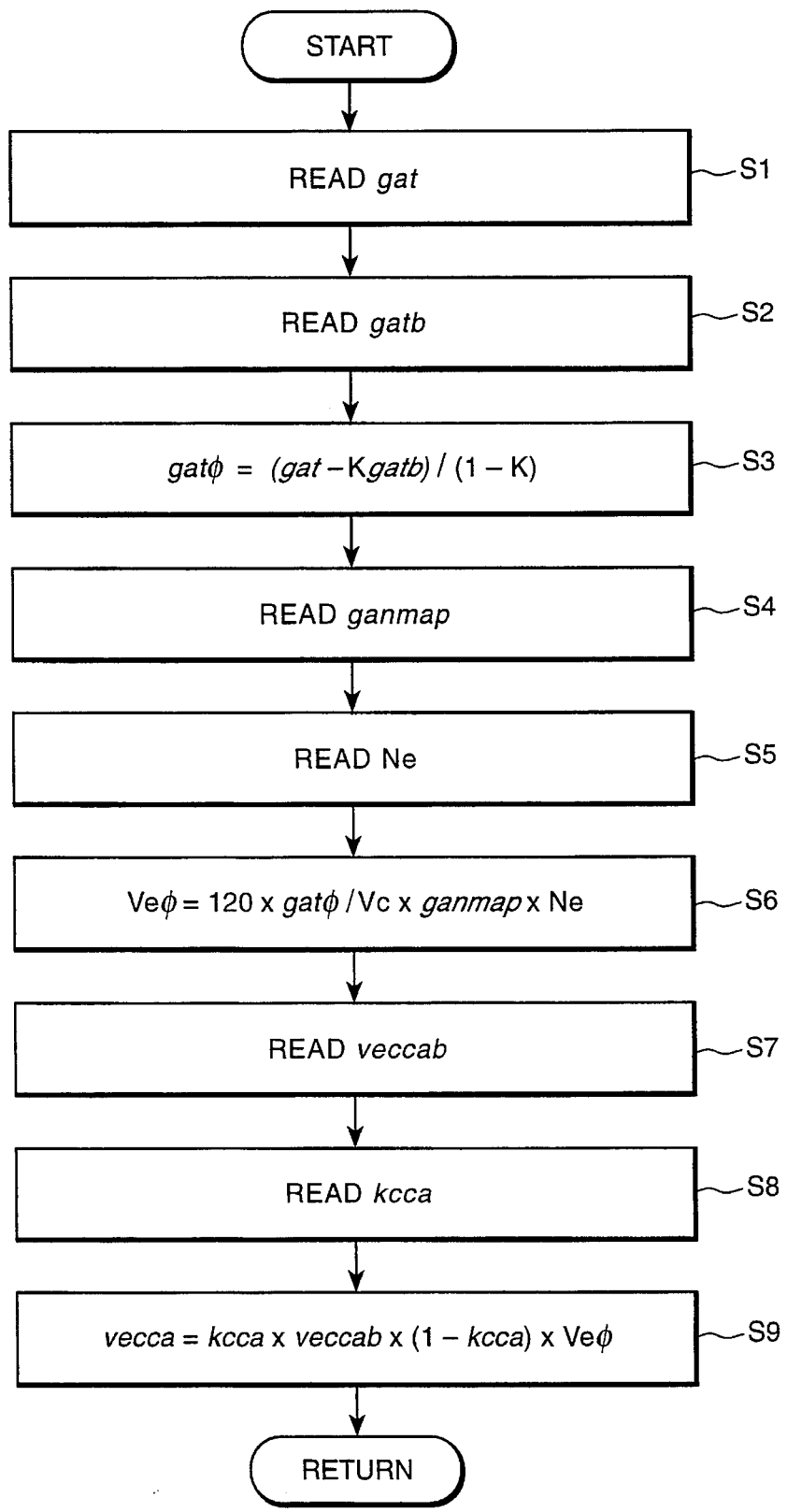
FIG. 2 is a flow chart illustrating the apparent volumetric efficiency computation sequential routine.
Figure 3:
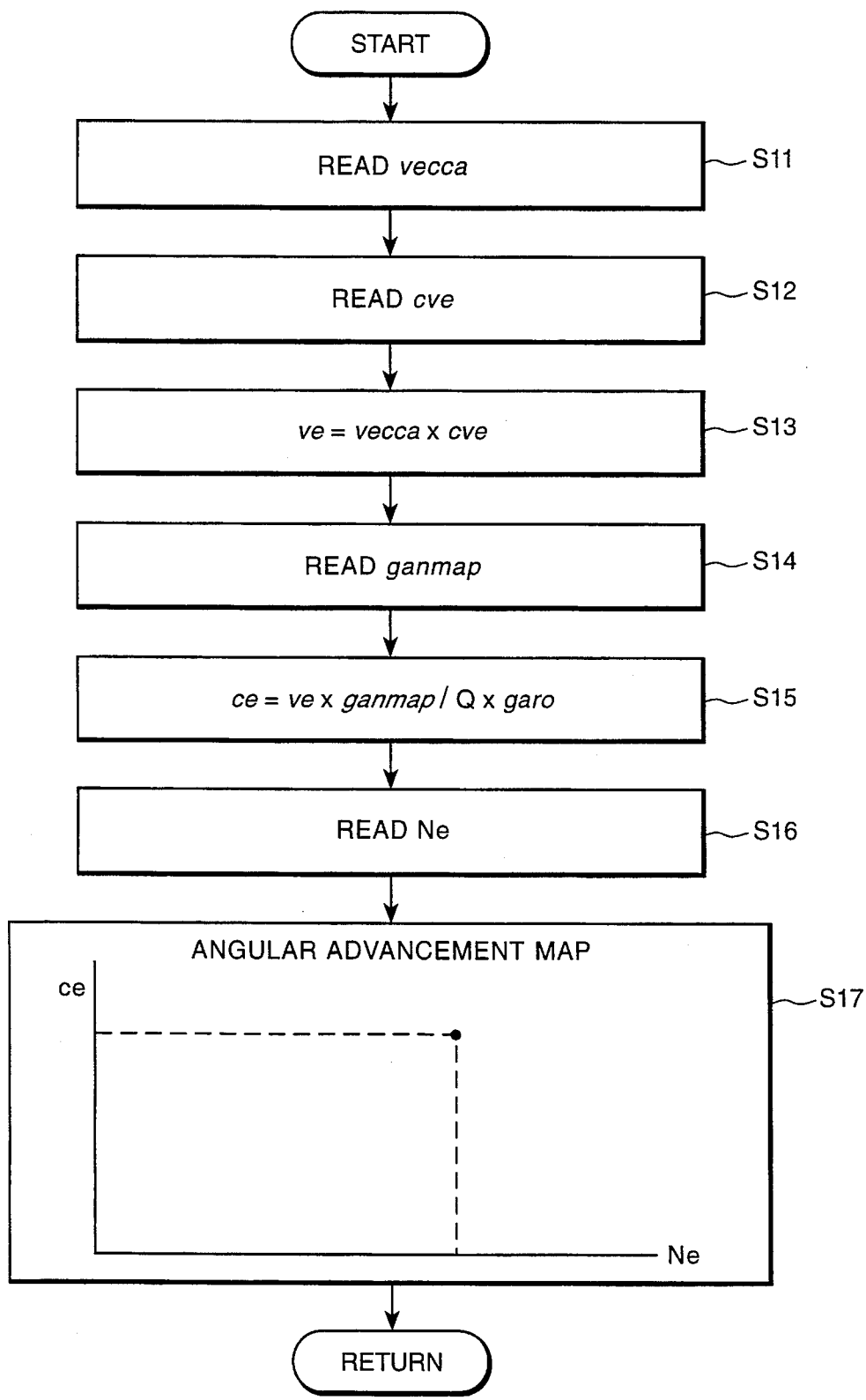
FIG. 3 is a flow chart illustrating the ignition timing control sequential routine.
Figure 4:
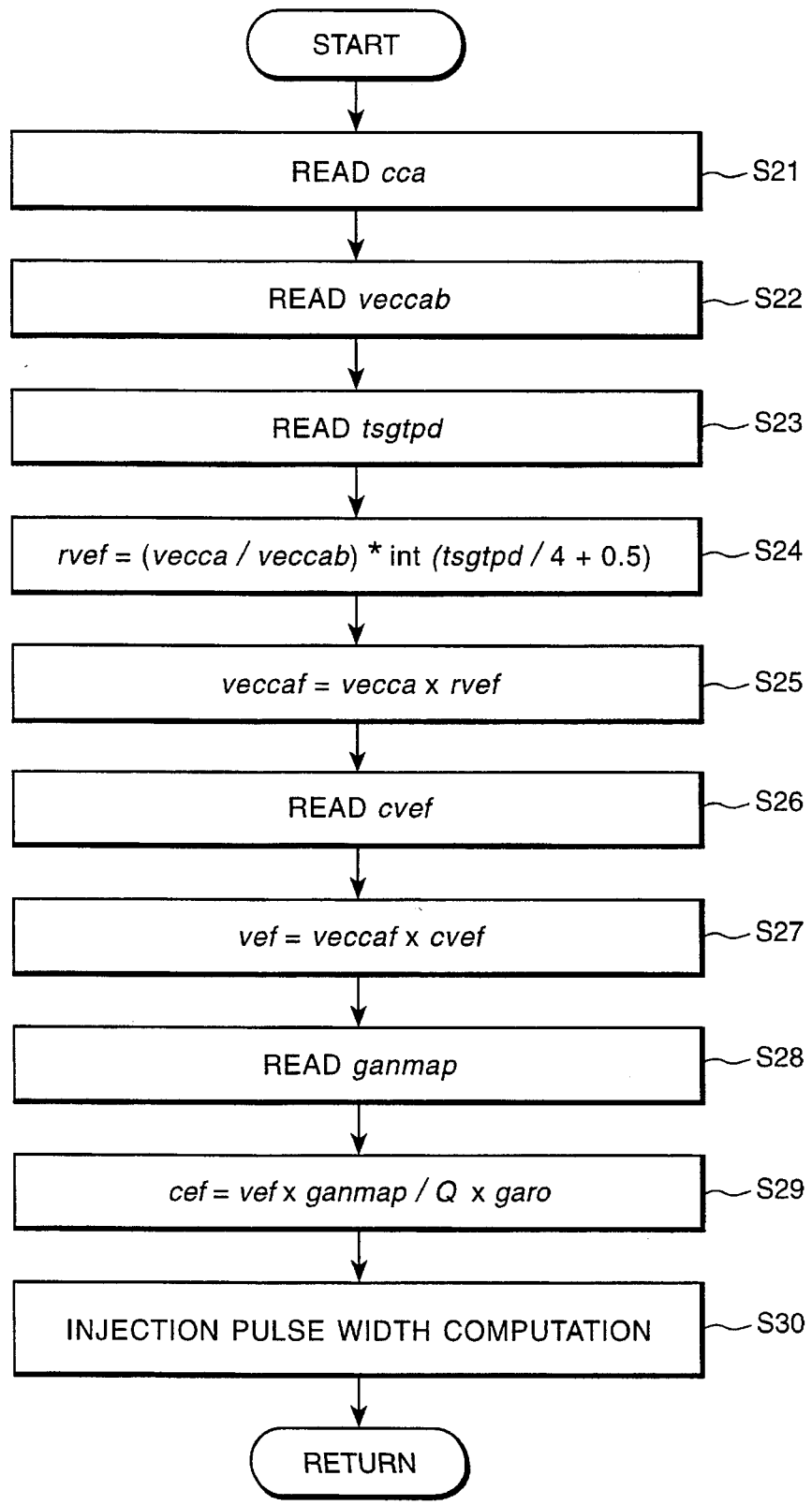
FIG. 4 is a flow chart illustrating the air-fuel ratio control sequential routine.

The engine control system depicted in FIG. 1 will be best understood by reviewing FIGS. 2–4, which are flow charts illustrating various routines for the microcomputer of the control unit (ECU) C. Programming a computer is a skill well understood in the art. The following description is written to enable a programmer having ordinary skill in the art to prepare an appropriate program for the microcomputer of the control unit (ECU) C. The particular details of any such program would of course depend upon the architecture of the particular computer selected.

Because general controls for the engine CE are not included within the scope of the present invention, the following description will be directed only to the computation of the apparent volumetric efficiency of air, i.e. the charging efficiency of air, into the combustion chamber 3 for each combustion cycle and the control of both the air-fuel ratio of a fuel mixture, i.e. the amount of fuel injection and the timing of ignition.

Referring to FIG. 2, which is a flow chart of the apparent volumetric efficiency computation sequential routine which is continuously repeated and executed every 4 milliseconds, the sequence routine commences and control proceeds directly to step S1 where a signal from the air flow sensor 15, which is representative of the current amount of intake air gat, is read. At step S2, the previous amount of intake air gatb, which is 4 milliseconds before now, i.e. in the apparent volumetric efficiency computation sequential routine, is subsequently read.

Based on the current and previous amounts of intake air gat and gatb, a correction of primary advancement is made so as to obtain the corrected amount of intake air gatϕ from the following Equation (I) at step:

$$gat\phi = (gat - K \times gatb)/(1 - K) \quad (I)$$

where K is the correction coefficient (primary advancement coefficient) for the delay of response due to thermal capacity which is a constant set in the range from 0 to 1 (0<K<1) in accordance with the thermal response characteristic of the air flow sensor 15.

This corrected amount of intake air gatϕ is basically calculated by adding to the current amount of intake air gat the difference between the current amount of intake air gat and the previous amount of intake air gatb multiplied by a specific proportional constant α(>0). That is, the corrected amount of intake air gatϕ is expressed by the following Equation (II):

$$gat\phi = gat + \alpha \times (gat - gatb) \quad (II)$$

In this instance, the difference (gat−gatb) represents the change of intake air in amount in one cycle (4 milliseconds) of the sequential routine for computing the apparent volumetric efficiency, and hence the rate of change in the amount of intake air gat, or the differential value of the amount of intake air gat, relative to time. For this reason, the anticipation of the change in the amount of intake air gat is made by adding α×(gat−gatb) to the current amount of intake air gat, i.e. by means of the differential procedure so that the delayed response due to thermal capacity of the air flow sensor 15 is corrected or compensated. In the Equation (II), the effect of the rate of change in the amount of intake air (gat−gatb) becomes more pronounced the larger the proportional constant α is, so that the differential procedure is enhanced. Furthermore, it is possible to transform the Equation (II) as follows:

$$\begin{aligned} gat\phi &= (\alpha + 1) \times gat - \alpha \times gatb \\ &= [gat - (\alpha/(\alpha + 1)) - gatb]/[1/(\alpha + 1)] \\ &= [gat - (\alpha/(\alpha + 1)) - gatb]/[1 - \alpha/(\alpha + 1)] \end{aligned} \quad (III)$$

Here, by substituting K for α/(α+1) in Equation (III), Equation (I) is obtained. Because the proportional constant α is larger than zero (0), the substitution K=α/(α+1) is between zero (0) and one (1). In such a manner, the correction of primary advancement is accomplished so as to correct or compensate the delay of response due to thermal capacity of the air flow sensor 15.

Thereafter, the density of intake air ganmap [$g/cm^3$], which is computed on the basis of the temperature of intake air, is read at step S4, and, then, the rotational speed of engine Ne (rpm), which is computed based on the crank angle detected by the distributor 11, is read at step S5. Subsequently, at step S6, the basic apparent volumetric efficiency Veφ, i.e. which is obtained based on the corrected amount of intake air gatφ, is computed from the following Equation (IV):

$$Ve\phi = 120 \times gat\phi/(Vc \times ganmap \times Ne) \qquad (IV)$$

where Vc is the total volume of exhaust gas of the engine CE; and the constant 120 is a conversion coefficient used to convert the number of engine rotations Ne (rpm) into the number of intake strokes per second.

Subsequently, the previous, or 4-millisecond-old, apparent volumetric efficiency veccab, is read at step S7, and then, the volumetric modification coefficient kcca for intake air is read is step S8. Here, the volumetric modification coefficient kcca for intake air is obtained in accordance with the rotational speed of engine Ne in a linear interpolation method by the use of a table parameterized by engine speed Ne. The volumetric modification coefficient kcca indicates the degree of volumetric modification for modifying of the basic apparent volume efficiency Veφ. At step S9, the current apparent volumetric efficiency vecca is computed from the following Equation (V) after the process of volumetric modification process performed on the basic apparent volumetric efficiency Veφ.

$$vecca = kcca \times veccab + (1-kcca) \times Ve\phi \qquad (V)$$

Thereafter, the sequential routine returns.

In the manner described above, the apparent volumetric efficiency computation sequential routine provides the computation of the apparent volumetric efficiency vecca every four (4) milliseconds. This apparent volumetric efficiency vecca is used as a control parameter in the ignition timing control routine and the air-fuel ratio control routine, which will be hereafter described in detail.

Referring to FIG. 3 showing a flow chart of the ignition timing control sequential routine which is an interrupt subroutine conducted each time a specific crank angle is reached, for instance, upon the end of intake stroke, the first step at step S11 is to read the current apparent volumetric efficiency vecca. Then, at step S12, the back flow correction coefficient cve is read. This current apparent volumetric efficiency vecca is a value computed in the apparent volumetric efficiency computation routine shown in FIG. 3, and the back flow correction coefficient cve, which is calculated by referring to a map parameterized by the apparent volumetric efficiency vecca and the rotational speed of engine Ne, is a corrective coefficient used to correct a decrease in apparent volumetric efficiency vecca caused by the back flow of air from the combustion chamber 3 into the intake port 2. Subsequent to the input of the current apparent volumetric efficiency vecca and the back flow correction coefficient cve, a correction of the apparent volumetric efficiency vecca is conducted with respect to back flow so as to obtain the correction value of apparent volumetric efficiency ve from the following Equation (VI) at step S13:

$$ve = vecca \times cve \qquad (VI)$$

Then, after reading the density of intake air ganmap at step S14, the charging efficiency of intake air ce is computed based on the corrected value of apparent volumetric efficiency ve and the density of intake air ganmap from the following Equation (VII) at step S15:

$$ce = ve \times ganmap/Qgaro \qquad (VII)$$

where Qgaro is the density of atmosphere [g/cm$^3$] under standard conditions, for instance, at 0° C. and one (1) atmosphere of pressure.

Because the charging efficiency of intake air ce is computed and found from the apparent volumetric efficiency vecca computed based on the current amount of intake air detected by the air flow sensor 15, it is an actual value.

After reading the rotational speed of engine Ne at step S16, the angular advancement corresponding to the charging efficiency of intake air ce and the rotational speed of engine Ne, which is necessary to the sparkplug 5, by the use of a map parameterized by rotational engine speed Ne and the charging efficiency of intake air ce at step S17. The sparkplug 5 is impressed with a high voltage by the spark control system 12 through the distributor 11 at a time in response to the angular advancement so as to ignite a vapor mixture in the combustion chamber 3.

By means of the ignition timing control, the charging efficiency of intake air is computed based on the actual amount of intake air, detected upon the completion of intake stroke, in according to which the timing of ignition is established, so as to optimize the timing of ignition for the actual charging efficiency of intake air, thereby realizing sufficient enhancement of fuel consumption efficiency and emission control.

Referring to FIG. 4, which is a flow chart of the air-fuel ratio control, or fuel injection control, sequential routine which is an interrupt subroutine conducted every time a specific crank angle is reached i.e. at, for instance, the beginning of an intake stroke, the first step at step S21 is to read the current apparent volumetric efficiency vecca. a previous apparent volumetric efficiency veccab, i.e. a four-millisecond-old apparent volumetric efficiency veccab, is subsequently read at step S22. At step S23, a predicted half turn (SGT) period tsgtpd [ms], which is the predicted length of time needed for the crank angle to advance 180° from the present position, is read. Then, at step S24, a predictive correction coefficient rvef is computed based on the current apparent volumetric efficiency vecca, the previous, or 4-millisecond-old, apparent volumetric efficiency veccab and the predicted half turn (SGT) period tsgtpd from the following Equation (VIII):

$$rvef = (vecca/veccab)^{**}int(tsgtpd/4+0.5) \qquad (VIII)$$

In this Equation (IX),  indicates a power (int(tsgtpd/4+ 0.5)-th power). For example, An means to raise A to n-th power or A$^n$, and int(α) indicates the part of whole number of a mixed decimal α, i.e. the whole number obtained by omitting the figures of a mixed number α below the decimal point. Further, the first term (vecca/veccab) indicates the rate of change R in apparent volumetric efficiency, and the second term int(tsgtpd/4+0.5) indicates a numerical value given by rounding the value resulting from dividing the predicted half-turn (SGT) period tsgtpd by the period of the apparent volumetric efficiency computation routine, i.e. 4 ms., to the nearest whole number.

Subsequently, at step S25, a subsequent, or 4-millisecond-ahead, apparent volumetric efficiency veccaf at a time by which the crank angle advances 180° is computed from the following Equation (IX):

$$veccaf = vecca \times rvef \qquad (IX)$$

Here, the predictive correction coefficient rvef is used to predict or estimate the apparent volumetric efficiency at a time the crank angle will have advanced 180° from a current time the apparent volumetric efficiency vecca is obtained. In other words, by multiplying the predictive correction coefficient rvef with the current apparent volumetric efficiency, the apparent volumetric efficiency veccaf at a time the crank angle will have advanced 180° is computed. Accordingly, both Equations (VIII) and (IX) can be considered to be ones that predict or estimate with a high degree of precision the apparent volumetric efficiency at a time the crank angle will have advanced 180° based on the present apparent volumetric efficiency and the rate of change in the present apparent volumetric efficiency.

Figure 5:
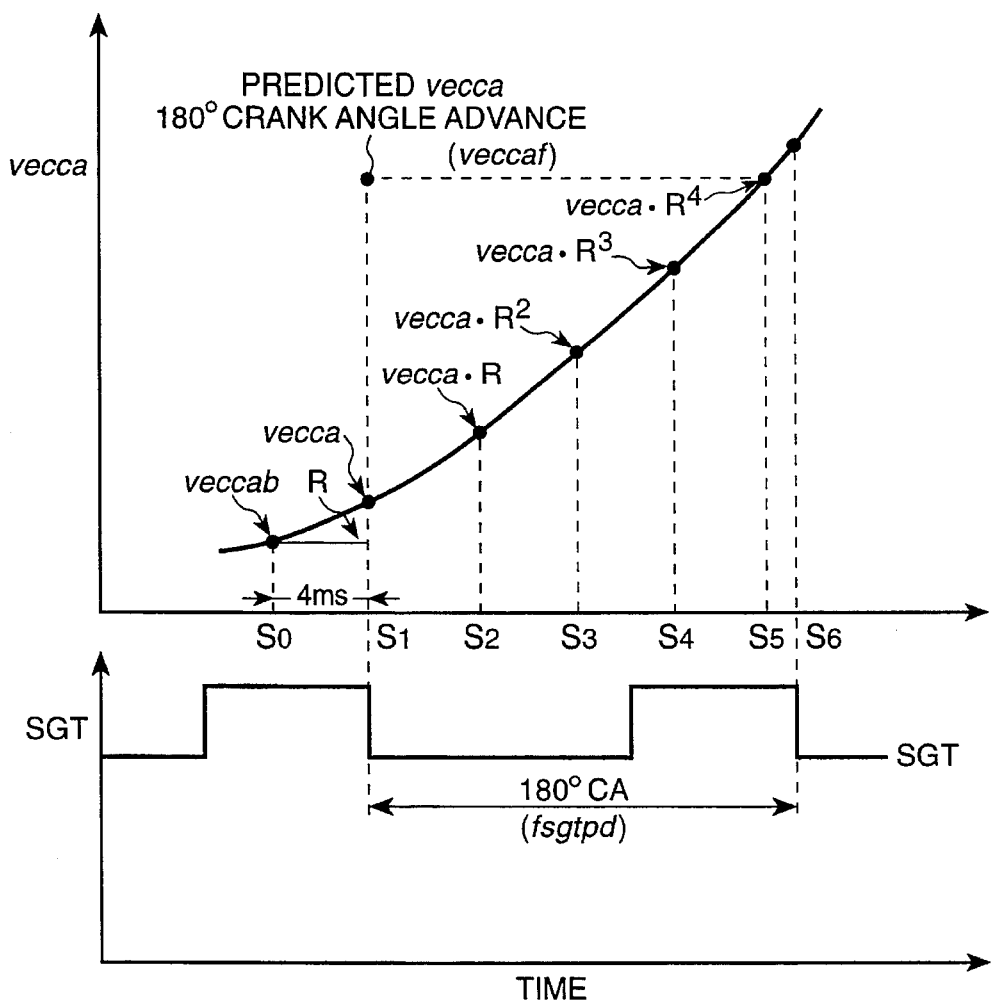
FIG. 5 is a time chart showing the relation of apparent volumetric efficiency and SGT signal with respect to time.

For instance, as shown in FIG. 5, taking $S_1$ as the present time, $S_0$ as a time 4 ms earlier, times $S_2$, $S_3$, $S_4$ and $S_5$ as times at intervals of 4 ms after the time $S_1$, and a time $S_6$ as a time the crank angle has advanced 180° after the present time $S_1$, the predicted value veccaf of the apparent volumetric efficiency computed from Equations (VIII) and (IX) is expressed by vecca×$R^4$.

In the manner described above, the apparent volumetric efficiency at a time the crank angle will have advanced 180° i.e. at the end of an intake stroke, can be computed with a high degree of precision based on the amount of intake air detected by the air flow sensor at the beginning of an intake stroke.

At step S26, the back flow correction coefficient cvef is read. This back flow correction coefficient cvef, which is used to correct a decrease in the predicted value of apparent volumetric efficiency veccaf caused by back flow, is found from a map parameterized by the predicted value of apparent volumetric efficiency veccaf and the rotational speed of engine Ne. Subsequently, at step S27, A correction of the predicted apparent volumetric efficiency is made so as to obtain a corrected value vef is computed for back flow with respect to the predicted value of apparent volumetric efficiency veccaf from the following Equation (X):

$$vef = veccaf \times cvef \quad (X)$$

Then, after reading the density of intake air ganmap at step S28, the predicted charging efficiency cef is computed based on the corrected value of the predicted apparent volumetric efficiency vef and the density of intake air ganmap from the following Equation (XI) at step S29:

$$cef = (vef \times ganmap)/Qgaro \quad (XI)$$

where Qgaro is the density of normal atmosphere [g/cm$^3$]. Based on the predicted charging efficiency cef computed at step S29, the pulse width for fuel injection is finally computed at step 30. The fuel injection valve 18 injects fuel the amount of which depends upon the injection pulse width.

As described above, with the air-fuel ratio control routine, the charging efficiency at a 180° rotative advancement of the crank i.e. at the end of an intake stroke, is predicted based on the output of the air flow sensor 15, which is represented by the amount of intake air, detected at the beginning of the intake stroke and the rate of change (vecca/veccab) of the current amount of intake air, setting the amount of fuel to be injected in accordance with the predicted charging efficiency. Accordingly, fuel is appropriately injected according to the change in the amount of intake air even when the amount of intake air is greatly changing during acceleration or deceleration, so as to enhance the precision of air-fuel ratio control, thereby improving fuel consumption efficiency and emission control.

With the engine control system according to the present invention, the timing of ignition, or the angle of advancement, is established based on the charging efficiency of intake air ce, i.e. the amount of air actually charged into the combustion chamber 3, which in turn is computed based on the actual amount of intake air detected by the air flow sensor 15 at the end of an intake stroke, while, on the other hand, the amount of fuel to be injected is established based on the amount of intake air detected by the air flow sensor 15 at the beginning of an intake stroke and the charging efficiency of intake air at the end of the intake stroke which is predicted based on the rate of change in the amount of intake air. Because of this, the charging efficiency of intake air is appropriately established relative to both ignition timing control and air-fuel ratio control, thereby enhancing fuel consumption efficiency and emission control.

It is to be understood that although the present invention has been described in detail with respect to a preferred embodiment thereof, various other embodiments and variants may occur to those skilled int the art, which fall within the scope and spirit of the invention. Such other embodiments and variants are intended to be covered by the following claims.

What is claimed is:

1. An engine control system for controlling an ignition time and an air-fuel ratio comprising:

air flow sensing means for detecting an amount of intake air; and control means for (1) conducting, prior to an intake stroke, a prediction of an amount of intake air to be introduced into a combustion chamber by an end of said intake stroke based on an amount of intake air detected prior to said intake stroke by said air flow sensing means and a rate of change in said amounts of intake air detected by said air flow sensing means between previous and current periods, (2) establishing an amount of fuel to be injected by the end of said intake stroke by a fuel injector based on an amount of intake air predicted, and (3) establishing an ignition time based on an actual amount of intake air introduced into said combustion chamber during said intake stroke and detected after said end of said intake stroke by said air flow sensing means.

2. An engine control system as defined in claim 1, wherein said control means predicts said amount of intake air to be introduced into the combustion chamber to be larger as said rate of change becomes larger with an increase in the amount of intake air predicted.

3. An engine control system as defined in claim 1, wherein said control means establishes said ignition time in accordance with a charging efficiency of intake air obtained based on said actual amount of intake air.

4. An engine control system as defined in claim 1, wherein fuel injection is made at least partly during said intake stroke.

5. An engine control system as defined in claim 1, wherein said control means conducts said prediction so that said amount of intake air to be introduced into said combustion chamber changes at a rate which becomes smaller with an increase in engine speed.

6. An engine control system as defined in claim 1, wherein said air flow sensing means detects said amount of intake air by an advanced first order correction.

7. An engine control system as defined in claim 6, wherein said air flow sensing means repeatedly detects said amount of intake air at a specified time interval.

8. An engine control system as defined in claim 6, wherein said air flow sensing means comprises an air flow sensor.

9. An engine control system for controlling an ignition time and an air-fuel ratio comprising:

air flow sensing means for detecting an amount of intake air; and control means for (1) conducting, prior to an intake stroke, a prediction of a charging efficiency of intake air charged into a combustion chamber by an end of an intake stroke based on an amount of intake air detected prior to said intake stroke by said air flow sensing means and a rate of change in said amounts of intake air detected by said air flow sensing means between previous and current periods, (2) establishing an amount of fuel to be injected during said intake stroke by a fuel injector based on the charging efficiency of intake air predicted, and (3) establishing an ignition time based on an actual charging efficiency of intake air detected after said end of said intake stroke.

10. An engine control system as defined in claim 9, wherein said control means predicts said charging efficiency of intake air will be larger as said rate of change becomes larger with an increase in said charging efficiency.

11. An engine control system as defined in claim 9, wherein fuel injection is made at least partly during said intake stroke.

12. An engine control system as defined in claim 9, wherein said control means conducts said prediction so that said charging efficiency of intake air changes at a rate which becomes smaller with an increase in engine speed.

13. An engine control system as defined in claim 9, wherein said air flow sensing means detects said amount of intake air by an advanced first order correction.

14. An engine control system as defined in claim 13, wherein said air flow sensing means repeatedly detects said amount of intake air at a specified time interval.

15. An engine control system as defined in claim 13, wherein said air flow sensing means comprises an air flow sensor.

* * * * *